(12) United States Patent
Kim et al.

(10) Patent No.: US 10,472,814 B2
(45) Date of Patent: Nov. 12, 2019

(54) VEHICLE TOILET WITH IMPROVED SANITATION AND SECURITY FEATURES

(71) Applicant: MAG Aerospace Industries, LLC, Carson, CA (US)

(72) Inventors: David Kim, Buena Park, CA (US); Oscar Mathews, Mission Viejo, CA (US); David Beach, Los Alamitos, CA (US); Razmik Boodaghians, Glendale, CA (US); Christopher Choi, Anaheim, CA (US); Christoph Goeschel, Seattle, WA (US); Joerg Stachowski, San Pedro, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 0 days.

(21) Appl. No.: 15/796,196

(22) Filed: Oct. 27, 2017

(65) Prior Publication Data
US 2019/0127963 A1  May 2, 2019

(51) Int. Cl.
| | | |
|---|---|---|
| *E03F 1/00* | (2006.01) | |
| *B64D 11/02* | (2006.01) | |
| *E03D 9/00* | (2006.01) | |
| *E03D 11/17* | (2006.01) | |
| *E03D 11/08* | (2006.01) | |

(52) U.S. Cl.
CPC .............. *E03F 1/006* (2013.01); *B64D 11/02* (2013.01); *E03D 9/00* (2013.01); *E03D 9/007* (2013.01); *E03D 11/08* (2013.01); *E03D 11/17* (2013.01)

(58) Field of Classification Search
CPC . E03F 1/00; B64D 11/02; E03D 9/052; A47K 11/04; A61L 9/04
See application file for complete search history.

(56) References Cited

U.S. PATENT DOCUMENTS

| | | | | |
|---|---|---|---|---|
| 4,376,314 | A * | 3/1983 | Iwans | E03F 1/006 4/420 |
| 6,330,725 | B1 * | 12/2001 | Karlsson | B60R 15/04 4/316 |
| 2006/0288472 | A1 | 12/2006 | Pondelick | |
| 2010/0243754 | A1 * | 9/2010 | Harris | A01M 1/2033 239/34 |
| 2012/0192344 | A1 * | 8/2012 | Novotny | E04H 1/1216 4/476 |
| 2013/0001254 | A1 * | 1/2013 | Pelfrey | G09F 9/35 222/173 |
| 2016/0207628 | A1 * | 7/2016 | Savian | B64D 11/02 |

(Continued)

FOREIGN PATENT DOCUMENTS

WO         2014081912          5/2014

OTHER PUBLICATIONS

International Patent Application No. PCT/US2017/058771, Invitation to Pay Additional Search Fee(s) and Partial Search Report, dated Jul. 12, 2018.

(Continued)

*Primary Examiner* — Eugene L Kim
*Assistant Examiner* — Christopher Glenn
(74) *Attorney, Agent, or Firm* — Kilpatrick Townsend & Stockton LLP; Dean W. Russell; Kristin M. Crall

(57) ABSTRACT

Methods and systems for equipping a toilet with hygiene and safety features by controlling and reducing potential escape of liquid waste from the toilet.

15 Claims, 8 Drawing Sheets

(56) References Cited

U.S. PATENT DOCUMENTS

| | | |
|---|---|---|
| 2016/0272320 A1 | 9/2016 | Beach et al. |
| 2016/0324378 A1* | 11/2016 | Padar .................. A47K 11/105 |
| 2017/0152655 A1* | 6/2017 | Abunameh ............. E03D 9/052 |
| 2017/0268213 A1* | 9/2017 | deLoache, III ........... E03D 9/00 |

OTHER PUBLICATIONS

International Patent Application No. PCT/US2017/058771, Search Report and Written Opinion, dated Sep. 5, 2018.

* cited by examiner

US 10,472,814 B2

VEHICLE TOILET WITH IMPROVED SANITATION AND SECURITY FEATURES

FIELD OF THE DISCLOSURE

Embodiments of the present disclosure relate generally to methods and systems for equipping a toilet with hygiene and safety features by controlling and reducing potential escape of liquid waste from the toilet.

BACKGROUND

Many types of passenger transportation vehicles (such as aircraft, ships, buses, trains, and any other passenger transport vehicles) use vacuum toilets. These toilets generally experience a very high service frequency, as there are typically only a few toilets provided that are intended to service hundreds of passengers. Vehicle toilets are often used in a small enclosed space, such as an aircraft lavatory. Although venting and odor-reduction features are provided in lavatories, cleanliness and waste splash may still present issues, particularly around the toilet shroud. For example, liquid waste can escape through the toilet rim vent holes onto a lavatory floor when the liquid is moving at a high velocity. This may be either human waste or other liquid galley waste being emptied into the toilet by aircraft attendants. Splashing of human and/or galley waste can cause corrosion of the area surrounding the toilet frame, leading to health and safety hazards. Odors due to waste spillage can also cause passenger and/or crew discomfort.

On international flights, toilet shrouds must be removed after every flight for security checks. This safety precaution may be done to ensure that no passenger has positioned a weapon or other contraband behind or within the toilet shroud. However, removal of the toilet shroud can be time-consuming and expensive.

Accordingly, improvements for maintaining cleanliness of the toilets while still incorporating safety features are provided herein.

BRIEF SUMMARY

Embodiments of this disclosure thus provide systems and methods for improved toilet rinse rings that can help prevent splash overflow that could otherwise migrate into the area located between the toilet bowl and the toilet shroud. The rinse ring system provides a series of walls and flanges that cooperate together in order to create a fluid escape channel and a labyrinth path. Embodiments also provide improved shrouded features that can enhance safety and security Certain embodiments relate to a rinse ring system for use with a toilet bowl and toilet shroud system, comprising: a rinse ring comprising a downwardly extending flange, and an extension member comprising a rear wall, a forward wall, and a base wall that collectively define a channel, the channel comprising one or more openings to allow fluid to drain therefrom. There are other features of the rinse ring system are described herein. It is also possible for the rinse ring system to be used in combination with a translucent shroud and/or a fragrance distribution system.

Further embodiments provide a vehicle toilet, comprising a transparent toilet shroud.

Further embodiments provide a fragrance distribution system for a vehicle toilet, comprising: a vehicle toilet shroud; a fragrance container positioned behind the vehicle toilet shroud such that it is guarded from external tampering; one or more fragrance delivering conduits fluidly cooperating with the fragrance container and configured to deliver fragrance to the vehicle toilet.

DETAILED DESCRIPTION

Figure 4:
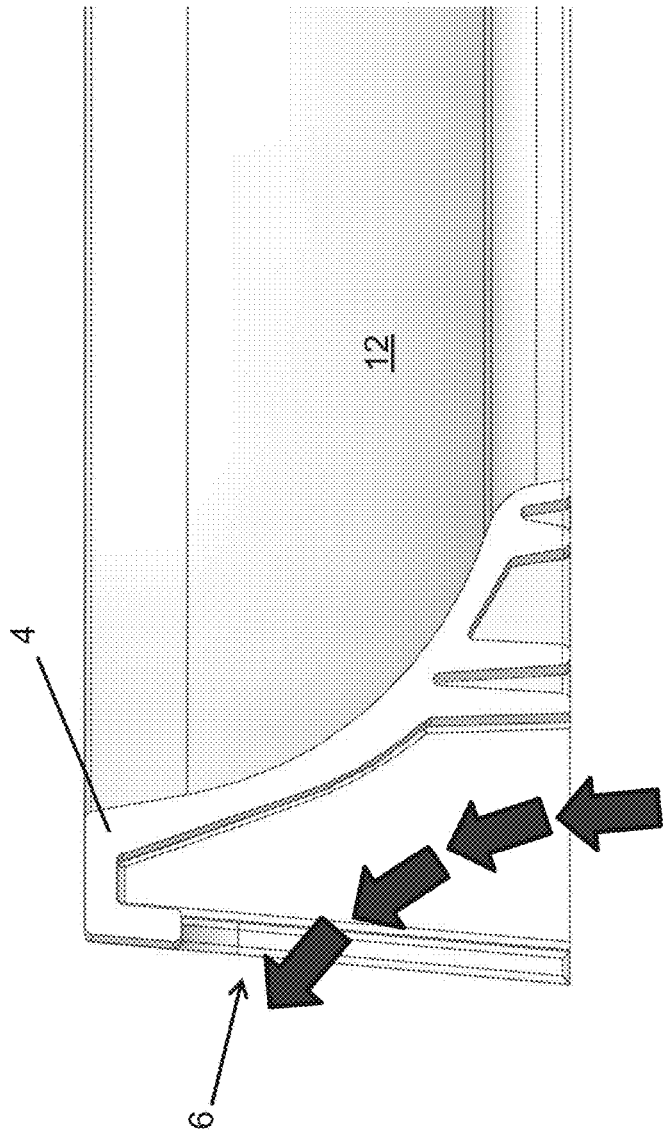
FIG. 4 shows a side view of a rinse ring of the prior art.

One embodiments of the present disclosure provides an improved rinse ring system 10. As background, vacuum toilets work by injecting air and water into the toilet bowl 12 via a rinse ring. The rinse ring is generally formed as a circular ring that is positioned around an upper edge of the toilet bowl 12 and is intended to deliver rinsing water during a flush. Because of the vacuum provided, regulations require that an airflow space 16 be provided between the toilet bowl 12 and the shroud 80 (which is an outer shell covering the toilet bowl 12 and which provides a support for the user). This airflow space 16 is intended to protect against potential suction creation between the vacuum system via a vacuum toilet flush and a passenger seated on the toilet without any air gaps. The airflow 16 space provides a pathway for air to enter the toilet bowl to release any suction lock that may otherwise be created. However, this airflow space 16 can also create a space for liquid and/or solid waste to become lodged, which can create bacterial growth and unpleasant odors. One example of liquid waste escaping through the airflow space 16 is illustrated by prior art FIG. 4. In this example, arrows illustrate waste splashing up from the toilet bowl, underneath the rinse ring 4, and out airflow space 6. This illustrates how the airflow space 6 air gap between the toilet rim and the shroud can become a path where waste can splash, collect, and drip down the side and the back of the shroud. Cleaning of the shroud is difficult at this location, without removing the shroud, which can generally be undesirable due to the maintenance, down-time, and related costs. However, trapped odors can create an unpleasant experience for passengers and crew. Accordingly, improvements for toilet/rinse ring/shroud interfaces are provided herein.

Figure 1:
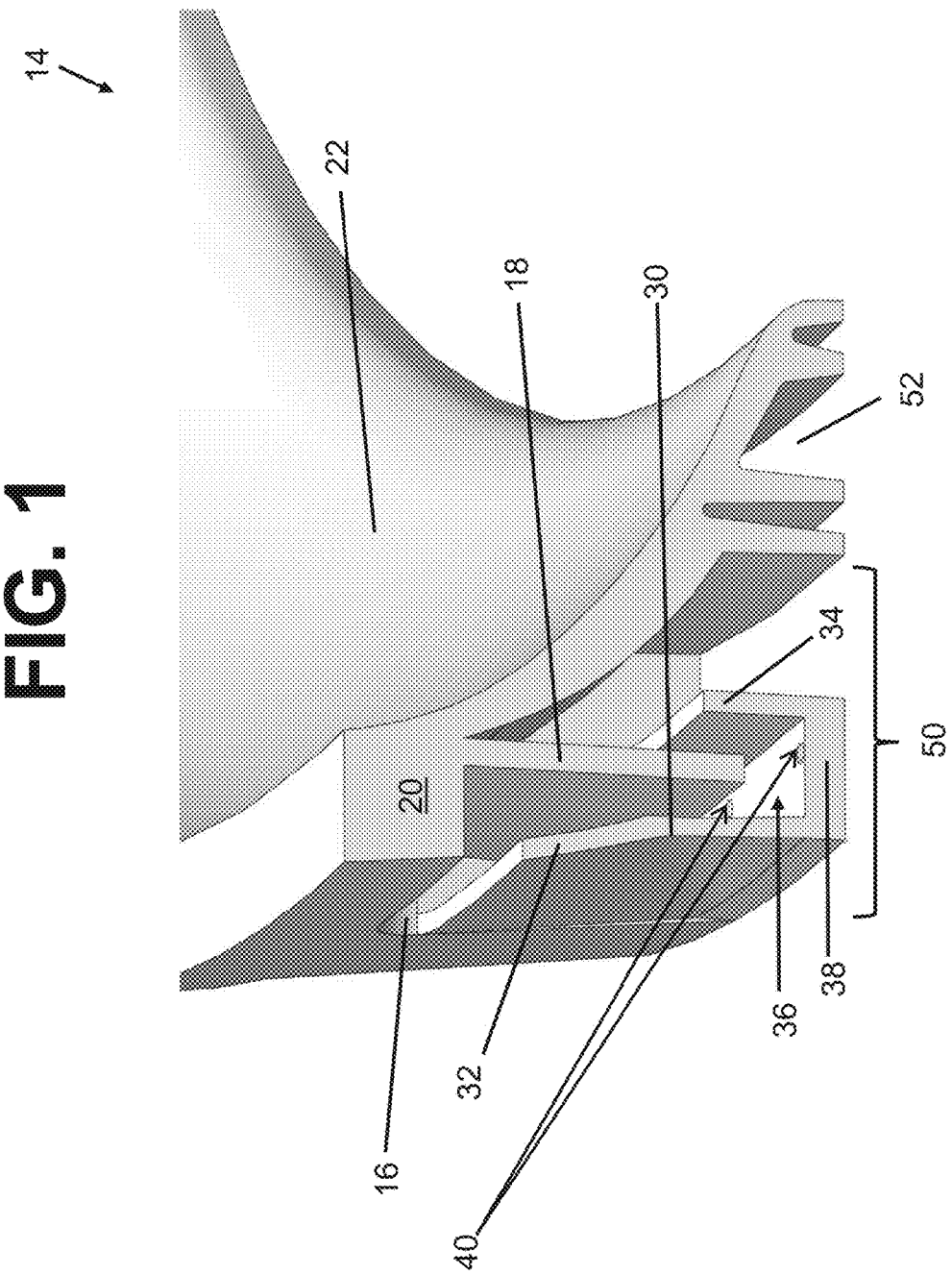
FIG. 1 shows a side perspective view of one example of a rinse ring described herein.
Figure 2:
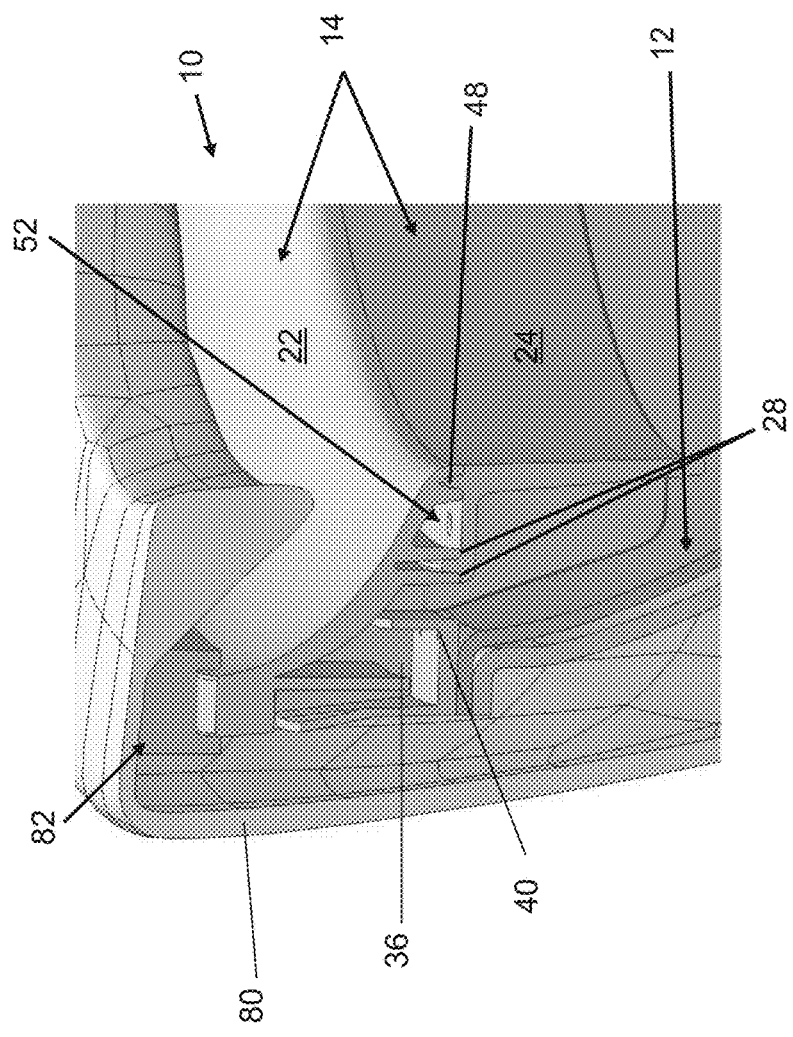
FIG. 2 shows a side perspective view of the rinse ring of FIG. 1 positioned on a toilet bowl and surrounded by a toilet shroud.
Figure 3:
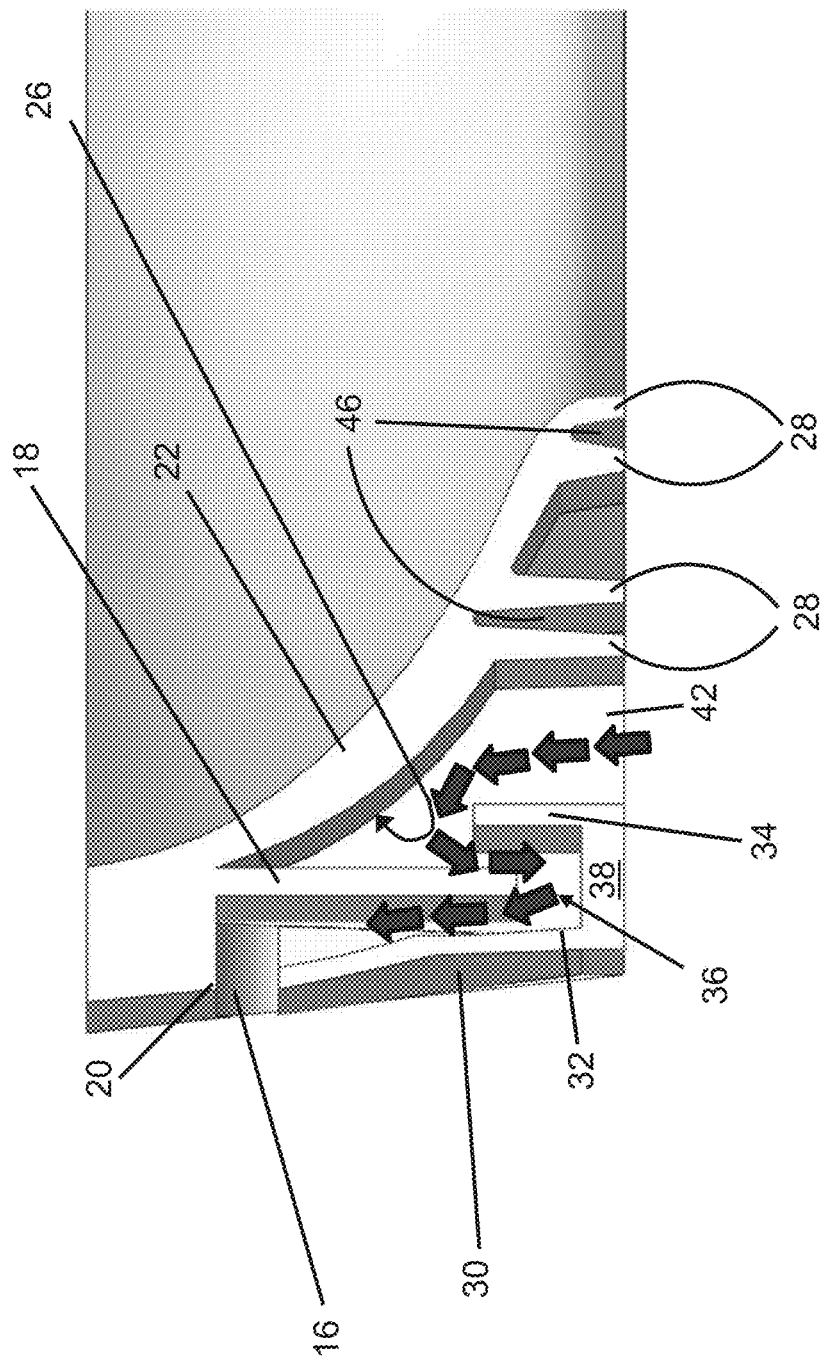
FIG. 3 shows a side view of the rinse ring of FIG. 1.

FIGS. 1-3 illustrate an improved rinse ring system 10. The general goal of the system 10 is to provide a mechanism to decrease the kinetic energy of liquid in order to prevent it from splashing out of the bowl and/or into the toilet shroud 80. This system thus provides a labyrinth path 50 through which upwardly splashing liquid from the bowl 12 must pass, prior to reaching the toilet shroud 80. FIG. 1 shows a rinse ring 14 that helps define an airflow space 16, but the airflow space 16 positioned at the end of a labyrinth path 50. This creates a tortuous path through which errant liquid must pass before even potentially reaching the airflow space 16.

The rinse ring 14 provides a sealed interface between the toilet 12 and the shroud 80, but that still allows the required air gap. As illustrated by FIG. 2, a spacer block 82 is positioned between the toilet shroud 80 and the rinse ring 14. The rinse ring 14 can be sealed adjacent the inner surface or external edge of the toilet rim, sealed directly against the toilet bowl, positioned to fit over the rim of the toilet bowl, integrated into the toilet bowl, or may have any other appropriate securement configuration. The rinse ring 14 provides a rinse channel 52 through which rinse water flows and is injected into the toilet bowl 12 during a flush via one or more injectors and/or openings 54 in the rinse ring 14.

In the example shown, the rinse ring 14 is a two-part molded configuration. As shown by FIGS. 2 and 3, support protrusions 28 of an upper portion of the rinse ring 14 create grooves 46 that receive tabs 48 of a lower portion of the rinse ring 14. The space therebetween may define the rinse channel 52. However, it should be understood that the rinse ring 14 may be provided as a single integrally molded component. It should also be understood that the rinse ring may be provided as multiple parts.

As illustrated by FIGS. 1 and 2, the rinse ring 14 has an outer circumferential flange 18 and an extension member 30. (Although the extension member 30 is shown as a component of the rinse ring, it should be understood that the extension member 30 may similarly be an upward extension from the toilet bowl edge.) The outer circumferential flange 18 extends downwardly from an upper block edge 20 of the rinse ring 14. The flange 18 is positioned so that it creates a splash-blocking wall in front of the airflow space 16. As illustrated, the rinse ring 14 also has an upper curved face 22 that cooperates with a lower skirt 24. Extending from a rearward surface 26 of the curved face 22 are support protrusions 28. The outer circumferential flange 18 is positioned closer to the upper edge 20 than to the support protrusions 28. It is generally positioned within a space created by drain channel 36 (described further below) and functions to define a tortuous path through which any errant splashing liquid must pass.

The extension member 30 defines a rear wall 32 and a forward wall 34 that collectively help define a U-shaped channel 36. The U-shaped channel 36 has a base wall 38 with one or more openings 40 therein and therethrough. The one or more openings 40 may be provided as circular openings, as elongated slots, as a grate portion (forming some or all of base wall 38), or as any other configuration that allows liquid to drain. As illustrated by FIGS. 2 and 3, in use, any upwardly splashing liquid (illustrated by arrows) will be directed into open space 42, which is located between the rearward surface 26 and the forward wall 34. Liquid will reflect off of rearward surface 26 and be directed into the U-shaped channel 36. The U-shaped channel 36 acts as a liquid waste trap/trough. Liquid will generally be caught within this channel portion 36 and be drained through the one or more openings 40. This draining function will drain captured waste back into toilet bowl. This improvement helps prevent the buildup or pooling of liquid waste at any point along the rinse ring system 10.

To the extent that any remaining liquid has sufficient velocity to continue its motion, liquid may bounce off of the base wall 38 of the channel 36 and be directed around the back side of flange 18, between the flange 18 and the rear wall 32. At this point, the liquid will lose its velocity and be unable to exit through the airflow space 16.

One benefit of this configuration is that it may be made modular. The rinse ring system 10 may be an optional add on that can be interchanged with existing rinse rings on improved vacuum toilet assemblies.

Rinse ring 14 and its related components may be manufactured by rotational molding out of ABS or other plastic. Carbon may be wrapped around the ABS part into order to reduce part count, hardware count, and to create a more smooth design for better cleaning. It may also be coated with one or more antimicrobial coatings or other features to help reduce the occurrence of bacterial growth.

Figure 5:
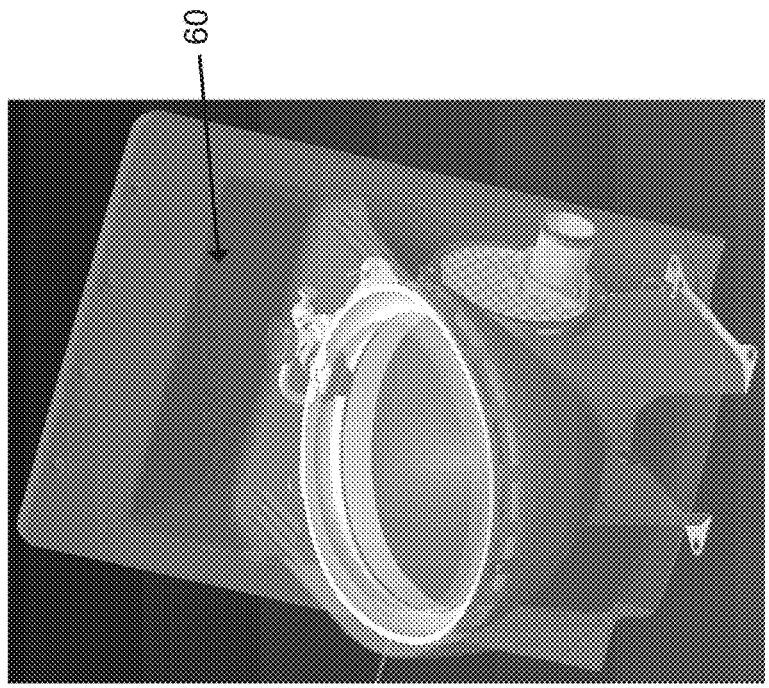
FIG. 5 shows a front perspective view of a prior art toilet shroud.
Figure 6:
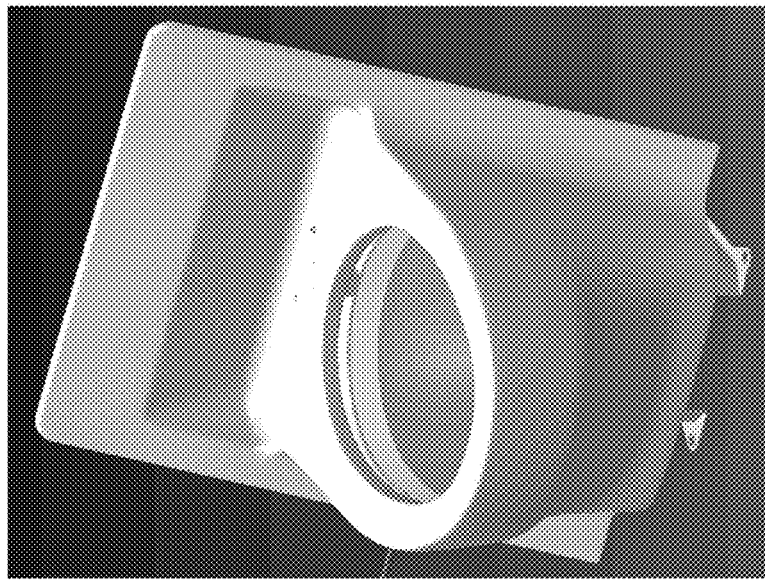
FIG. 6 shows a front perspective view of a transparent toilet shroud described herein.

An additional feature that may be provided in connection with the rinse ring system 10 described (or that may be provided separately from the rinse ring system described), is a transparent shroud 60. A traditional toilet shroud is illustrated by FIG. 5, and a transparent toilet shroud is illustrated by FIG. 6, for comparison purposes. Providing a transparent and see-through shroud 60 enables maintenance personnel to observe any accumulation of waste within the shroud as a health monitoring device. It may be, however, undesirable to allow users to view the inner workings/components of the toilet system. Accordingly, it is possible to use technology that optically changes the transparency of the transparent shroud 60 in use. One non-limiting example of such technology includes running current through glass or other shroud material in order to cause the glass/material to become opaque. This may be referred to as switchable glass technology, smart glass, or electrochromatic glass. It is envisioned that these technologies may also be developed for use in combination with materials other than glass, such as plastics or other materials. Another non-limiting example may include providing a backlight within the shroud to create a pleasing glow.

A non-transparent shroud may hinder the process of inspection for health monitoring as well as for security checks. Both of these instances may be addressed by providing a shroud that is made transparent by various means. This will also allow the transparent shroud 60 to provide an additional security measure. For example, on some flights, the toilet shroud may need to be removed during the maintenance process in order to ensure that no weapons or contraband have been positioned behind the toilet shroud. Providing a transparent shroud 60 can prevent this additional (as well as time-consuming and expensive) maintenance step from being required. Maintenance personnel or security officials may simply look through the transparent toilet shroud 60 in order to confirm that nothing has been positioned therein.

A reverse option may also be provided. This option is to provide a shroud that can be made transparent or otherwise see-through. For example, the shroud may be made of a material that is generally opaque or otherwise non-transparent, but that can be made see-through with the presence of light as a sanitary and/or security measure. For example, the shroud may be made transparent or opaque via exposure to LED light, UV light, or any other type of light source. In another example, the shroud may be made transparent or opaque via application or reduction of electric current exposure. In another example, the shroud may be made transparent or opaque via exposure to heat or various temperatures. In one example, the shroud material can be a plastic material that is translucent when backlit, allowing one to see directly into the shroud. Another option is shroud material made using a plastic material that is translucent when light is present.

A further option may be to provide a transparent, clear, plastic shroud 60 with a plastic film applied to the shroud. The plastic film hay have an adhesive backing or other securement system that allows the film to be applied to the shroud. The film may be applied to an external surface of the shroud or to an internal surface of the shroud. However, it may be more secure to provide the film along an internal surface of the shroud. The film may be capable of changing color back and forth between clear and opaque in order to manage or change the transparency of the shroud. In some examples, the film changes from opaque to clear by applying voltage (current) to the film. It should be understood that the film may be applied to only strategic or selected areas of the transparent shroud in order to make only certain areas selectively changeable between transparent and opaque, such that the film need not be applied to the entire shroud surface.

Figure 7:
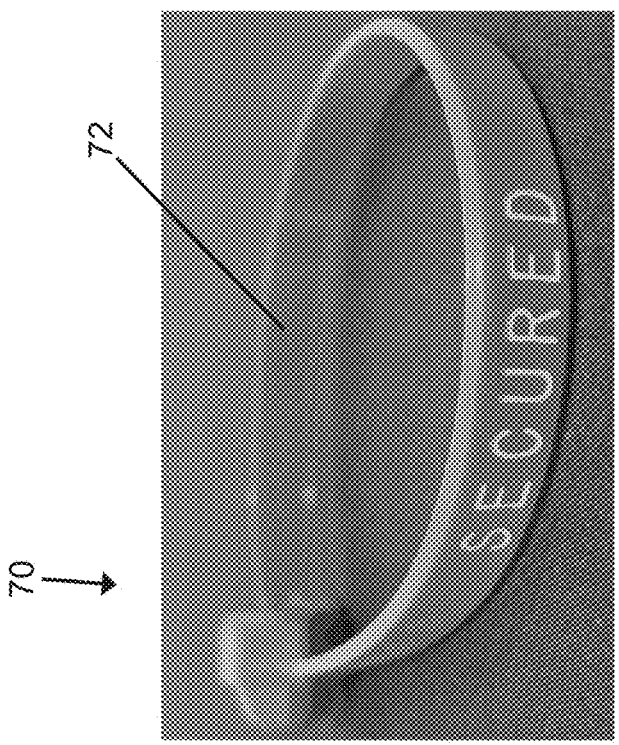
FIG. 7 shows one example of a tamper-evident feature in the form of a security band.

A further safety option for the toilet shroud is to provide one or more tamper evident features 70 for securing shroud envelope. Such tamper-evident features 70 will be used to prevent unauthorized removal of the shroud. One example of a tamper-evident feature 70 is a security band 72 illustrated by FIG. 7. In this example, one portion of the band 72 may be positioned on the shroud and another portion of the band 72 may be positioned on a fixed point in the laboratory. If the shroud is removed or otherwise tampered with, the security band 72 will be broken.

Another option of a tamper-evident feature 70 that may be used is one or more tearaway stickers. In this example, one leg of the sticker may be secured along various portions of the toilet shroud edge and another leg of the sticker may be secured to the lavatory floor and/or wall. Evidence of tear(s) in the sticker(s) will indicate to security that the shroud has been removed or otherwise tampered with.

A further option of a tamper-evident feature 70 is the use of a lacquer that evidences a break or tear. For example, the lacquer may be a paintable, spreadable, or sprayable solution that is applied along the shroud edges where the shroud contacts the lavatory floor and/or wall. Evidence of a bubble or tear or written a lacquer will indicate to security that the shroud has been removed or otherwise tampered with.

Figure 8:
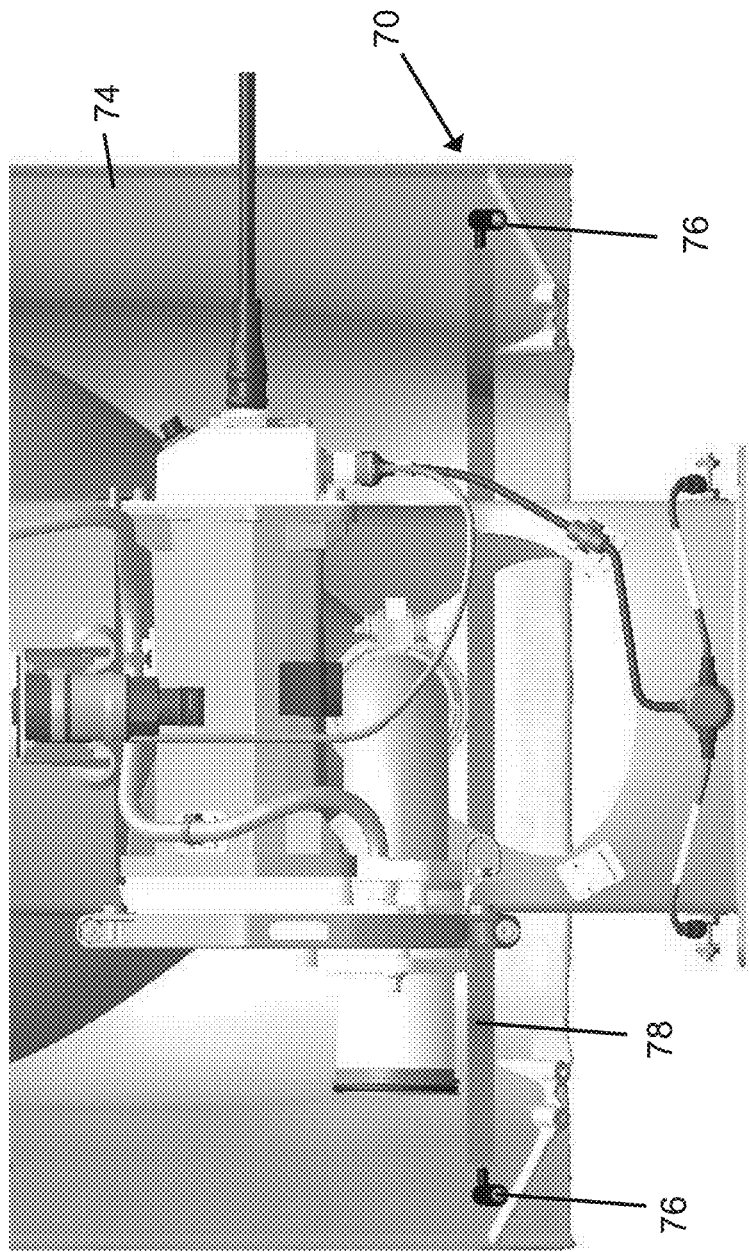
FIG. 8 shows another example of a tamper-evident feature in the form a pin and wire system that creates an electrical circuit.
Figure 9:
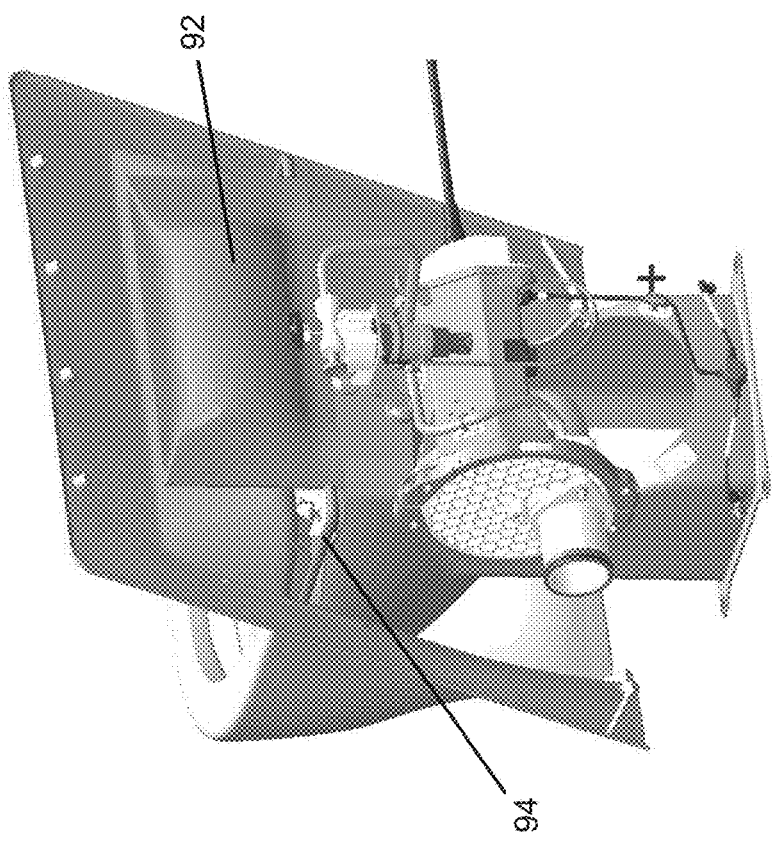
FIG. 9 shows a side perspective view of one embodiment of a fragrance distribution system described herein.

Another option of a tamper-evident feature 70 is illustrated by FIGS. 8 and 9. In this example, the feature 70 is a shroud 74 that has one or more spring pin connectors 76 and copper (or other metal) strip 78 that will create a closed loop, with electricity running through it. When the shroud 74 is removed or otherwise tampered with, the circuit will break and create an alert or signal. In one example, the alert or signal may be a light signal on a computer or monitoring screen that is accessible to the crew and/or maintenance personnel. Any other type of sensor or signaling system may be used and is considered within the scope of this disclosure. The type and number of sensors or connections can be modified according to airline preference and/or space availability.

Figure 10:
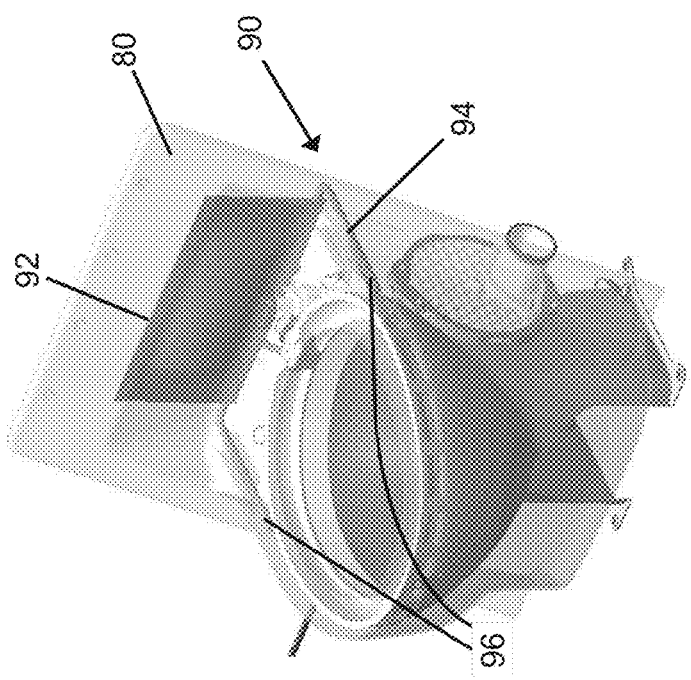
FIG. 10 shows a rear perspective view of an alternate embodiment of a fragrance distribution system described herein.

A further feature that may be provided with the toilet systems described herein is a fragrance distribution system 90. The fragrance distribution system 90 may be used to eliminate unwanted odors. As illustrated by FIGS. 9 and 10, a fragrance container 92 may be positioned on or near the shroud 80. In the example shown, the fragrance container 92 is a fragrance bag that is positioned at a rear location of the toilet frame. In order to maintain safety and prevent tampering with the fragrance container 92, the fragrance container 92 is positioned behind the shroud. This ensures that the fragrance container 92 is only accessible by maintenance personnel or security. It is possible for the fragrance container 92 to be positioned behind a transparent shroud 80, as illustrated by FIG. 9. It similarly possible for the fragrance container 92 to be positioned behind a non-transparent shroud, as illustrated by FIG. 10. It is generally envisioned that the fragrance container 92 may be positioned along a base or rear portion of the toilet frame as illustrated. However, it should be understood that the fragrance container 92 may be positioned near the flush valve, within an opening of the toilet frame base, along sides of the frame, or in any other appropriate location. The fragrance container 92 may be mounted using any appropriate mounting technology. For example, the fragrance container may be mounted via hook and loop strips, via quick snaps, via openings received by protrusions, or by any other appropriate mounting system.

In any event, the fragrance container should have one or more fragrance delivering conduits 94 fluidly associated therewith. The fragrance delivering conduits 94 are configured to deliver fragrance contained in the fragrance container 92 to a location on or near the toilet bowl 12. In one example, it is possible for these fragrance delivering conduits 94 to be positioned such that they deliver fragrance through the rinse ring 14. In this example, the fragrance delivering conduits 94 are fluidly connected with the fragrance container 92, and curve along (or otherwise track) sides of the shroud. It is possible for the fragrance delivering conduits 94 to be permanently affixed or otherwise attached to the shroud. In another example, it is possible for the fragrance delivering conduits 94 to be separately removable from the shroud and the fragrance container 92. Fragrance delivering ends 96 may be positioned at or near the rinse ring. The fragrance may be delivered through a similar channel as the rinse water. In other examples, the fragrance delivering ends 96 may be positioned externally to the toilet bowl 12. In this instance, the fragrance puff may be delivered to the air outside the toilet bowl.

The base material that provides the fragrance may be a liquid, a solid state, a gel, a gas, a vaporizable material, or any other appropriate fragrance delivery mechanism. The material may be provided in any form of matter that can be housed in a fragrance container 92. It is envisioned that activation of the fragrance may occur via pressure that forces a fluid through conduits 94, vapor escaping from the conduits 94, a heat change for a solid material, or any other appropriate delivery or activation.

In use, once a flush has been completed (and/or in combination with the flush), a sensor or other system may be activated to deliver a puff of fragrance. This may be actuated automatically, whenever a flush occurs. In other examples, it is possible to provide a user-activated fragrance puff. In this instance, a touchscreen or other user interface may be provided that will allow a user to administer a fragrance puff. It is possible to provide fragrances that are customizable based on a user's preference or based on an airline's preference. It is possible to provide a standard fresh fragrance option that may be customized or modified by adding an additional scent options.

Changes and modifications, additions and deletions may be made to the structures and methods recited above and shown in the drawings without departing from the scope or spirit of the disclosure or the following claims.

What is claimed is:

1. A rinse ring system for use with a toilet bowl and toilet shroud system, comprising:
   a rinse ring comprising a downwardly extending flange, and an extension member comprising a rear wall, a forward wall, and a base wall that collectively define a channel, the base wall comprising one or more openings to allow fluid to drain therefrom, wherein the downwardly extending flange is positioned within the channel and creates a splash-blocking wall in front of an airflow space between the toilet bowl in the toilet shroud.

2. The system of claim 1, wherein the flange extends from an upper block edge of the rinse ring.

3. The system of claim 1, wherein the rear wall has a larger height than the forward wall.

4. The system of claim 1, wherein the rinse ring further comprises a curved face and a lower skirt, wherein the flange is positioned rearwardly of the curved face and the lower skirt.

5. The system of claim 1, wherein the one or more openings in the base wall comprise holes, slots, grated portions, or any combination thereof.

6. The system of claim 1, wherein an open space is defined between a rearward surface of the rinse ring and the forward wall of the extension member, and wherein upwardly splashing liquid from the toilet bowl enters the open space, is directed by the rearward surface into the channel, and drains through the one or more openings.

7. The system of claim 1, further comprising an airflow space positioned above the rear wall of the extension member.

8. The system of claim 7, where in the airflow space is blocked by the downwardly extending flange.

9. The system of claim 1, wherein the downwardly extending flange, rear wall, forward wall, and base wall collectively form a labyrinth path designed to slow upwardly splashing fluid.

10. The system of claim 1, further comprising a spacer block positioned between the rinse ring and a toilet shroud.

11. The system of claim 1, wherein the toilet shroud transitions between a transparent toilet shroud and a non-transparent shroud.

12. The system of claim 1, further comprising one or more tamper-evident features configured to alert crew that the shroud has been tampered with.

13. The system of claim 12, wherein the one or more tamper evident features comprise a security band, a lacquer seal, a tearaway sticker, a pin and wire connection creating an electrical circuit, a sensor, or any combination thereof.

14. The system of claim 1, further comprising a fragrance distribution system.

15. The system of claim 14, wherein the fragrance distribution system comprises a fragrance container fluidly connected to one or more fragrance delivering conduits.

* * * * *